(12) United States Patent
Knee

(10) Patent No.: US 8,290,042 B2
(45) Date of Patent: Oct. 16, 2012

(54) SPORT ACTION CODING

(75) Inventor: Michael James Knee, Petersfield (GB)

(73) Assignee: Snell & Wilcox Limited, Hampshire (GB)

( * ) Notice: Subject to any disclaimer, the term of this patent is extended or adjusted under 35 U.S.C. 154(b) by 1553 days.

(21) Appl. No.: 11/674,240

(22) Filed: Feb. 13, 2007

(65) Prior Publication Data

US 2007/0198906 A1    Aug. 23, 2007

(30) Foreign Application Priority Data

Feb. 13, 2006  (GB) .................................. 0602849.2

(51) Int. Cl.
*H04N 11/02* (2006.01)

(52) U.S. Cl. .................. 375/240.14; 382/239; 382/260

(58) Field of Classification Search ............. 375/240.14; 382/239, 260
See application file for complete search history.

(56) References Cited

U.S. PATENT DOCUMENTS

| | | | | |
|---|---|---|---|---|
| 5,001,560 A * | 3/1991 | Ericsson | ................... | 375/240.14 |
| 5,079,630 A * | 1/1992 | Golin et al. | ............... | 375/240.08 |
| 6,256,423 B1 | 7/2001 | Krishnamurthy et al. | .... | 382/251 |
| 6,263,021 B1 | 7/2001 | Sethuraman et al. | | |
| 6,496,607 B1 | 12/2002 | Krishnamurthy et al. | | |
| 2002/0106023 A1 | 8/2002 | O'Neill | ..................... | 375/240.12 |
| 2002/0122489 A1* | 9/2002 | Kuniba | ..................... | 375/240.21 |
| 2002/0141650 A1* | 10/2002 | Keeney et al. | ................ | 382/239 |
| 2004/0165664 A1* | 8/2004 | Karczewicz et al. | ..... | 375/240.16 |
| 2005/0053296 A1* | 3/2005 | Srinivasan et al. | ............ | 382/236 |
| 2005/0169548 A1 | 8/2005 | Ducksbury et al. | | |
| 2005/0244076 A1* | 11/2005 | Ratakonda et al. | ........... | 382/260 |
| 2005/0286628 A1* | 12/2005 | Drezner | ..................... | 375/240.2 |
| 2008/0131072 A1* | 6/2008 | Chang et al. | .................... | 386/52 |

FOREIGN PATENT DOCUMENTS

| | | |
|---|---|---|
| EP | 1 227 684 | 7/2002 |
| EP | 1274250 | 1/2003 |
| GB | 2401405 | 1/2005 |
| WO | WO 99/22518 | 5/1999 |
| WO | WO 00/00933 | 1/2000 |
| WO | WO 03/107677 | 12/2003 |
| WO | WO 2005/004062 | 1/2005 |
| WO | WO2005004062 * | 1/2005 |
| WO | WO 2005/020584 | 3/2005 |

OTHER PUBLICATIONS

Sadka, "Flow Control in Compression Video Communications", Apr. 25, 2002, Wiley Books, pp. 75-119.*
Examiner Thomas Gries, "Communication Pursuant to Article 94(3) EPC," European Application No. 07 250 324.6-1522, dated Mar. 21, 2011, 10 pages.
Motorola: "EP02000955—Amended claims version May 11, 2004 of European Patent Application EP02000955," European Patent Register, Nov. 5, 2004, 2 pages.

* cited by examiner

*Primary Examiner* — Taghi Arani
*Assistant Examiner* — Gregory Lane
(74) *Attorney, Agent, or Firm* — Fish & Richardson P.C.

(57) ABSTRACT

A method of compressing data representing a sequence of images in dependence upon data defining at least one region of particular interest within at least one image in the sequence includes causing data representing an image region that is not of particular interest to be more highly compressed than data representing an image regions that is of particular interest.

4 Claims, 4 Drawing Sheets

SPORT ACTION CODING

FIELD OF INVENTION

This invention concerns the compression of image data and the pre-processing of image data prior to compression. It is directed to the reduction of artifacts due to compression in a known region or regions of interest within the image.

RELATED APPLICATIONS

Under 35 USC 119, this application claims the benefit of the priority date of UK application No. 0602849.2, filed on Feb. 13, 2006, the contents of which are incorporated herein by reference.

BACKGROUND OF THE INVENTION

A common video compression problem is the allocation of a fixed information bandwidth in a way which maximizes the perceived imaged quality to an observer.

There is increasing interest in the delivery of video programs to portable devices with small display screens—such as mobile telephones. The available information capacity on the radio links used in such applications is very low and significant compression artifacts are often present when known compression schemes such as MPEG-2 or H-264 are used.

SUMMARY OF THE INVENTION

The inventor has appreciated that, particularly in the case of the broadcasting of sporting events, it is highly beneficial to apply more of the available information transmission capacity within an image region of particular interest, and less of the available information transmission capacity outside that region. A typical viewer of such a transmission is likely to be much more tolerant of compression artifacts (such as resolution loss) in areas outside the area of interest. If there is available a "mask" signal which identifies the area of interest within the picture to be coded, then the video may be pre-processed in dependence upon the mask information, or the compression coding can be changed in dependence upon the mask information. For example, in the transmission of a football match, it is often the case that the upper part of the transmitted picture comprises spectators and the stadium structure, whereas the lower part of the picture includes the pitch and the players.

The invention consists, in a first aspect, of method and apparatus for compressing data representing a sequence of images in dependence upon data defining a region or regions of particular interest within one or more images in the sequence, in which data representing image regions outside the regions of particular interest is more highly compressed than data representing image regions inside the regions of particular interest.

Suitably, image regions outside said regions of interest are spatially or temporally filtered prior to compression.

Advantageously, the compressed image data includes data representing differences between images in the sequence that have been spatially or temporally filtered, or predictions errors derived from such images, and also includes data representing images in the sequence that have not been filtered.

For example the data representing differences between images, or prediction errors, can comprise MPEG P or B frames and the data representing unfiltered images can comprise MPEG I-frames.

In an alternative embodiment, higher compression outside the area of interest is achieved by allocating less data to the description of visually unimportant video features outside the area of interest.

Suitably, the visually unimportant video features are high spatial frequency components.

Advantageously, less data is used to describe differences between images in the sequence or prediction errors derived from images in the sequence.

For example, less data can be applied to MPEG P or B frames.

The above-mentioned techniques can be applied to video compression methods which make use of transform-coding and the quantization, attenuation or deletion of transform coefficients.

In a second embodiment the invention consists in a video compression pre-processor having a video input and a mask input identifying at least one area of interest within an image represented by the video input wherein the video is processed in dependence upon the mask input.

Advantageously, the input video is spatially or temporally filtered in dependence upon the mask input.

BRIEF DESCRIPTION OF THE DRAWINGS

Some examples of the invention will now be described with reference to the drawings in which.

DETAILED DESCRIPTION OF THE INVENTION

Figure 1:
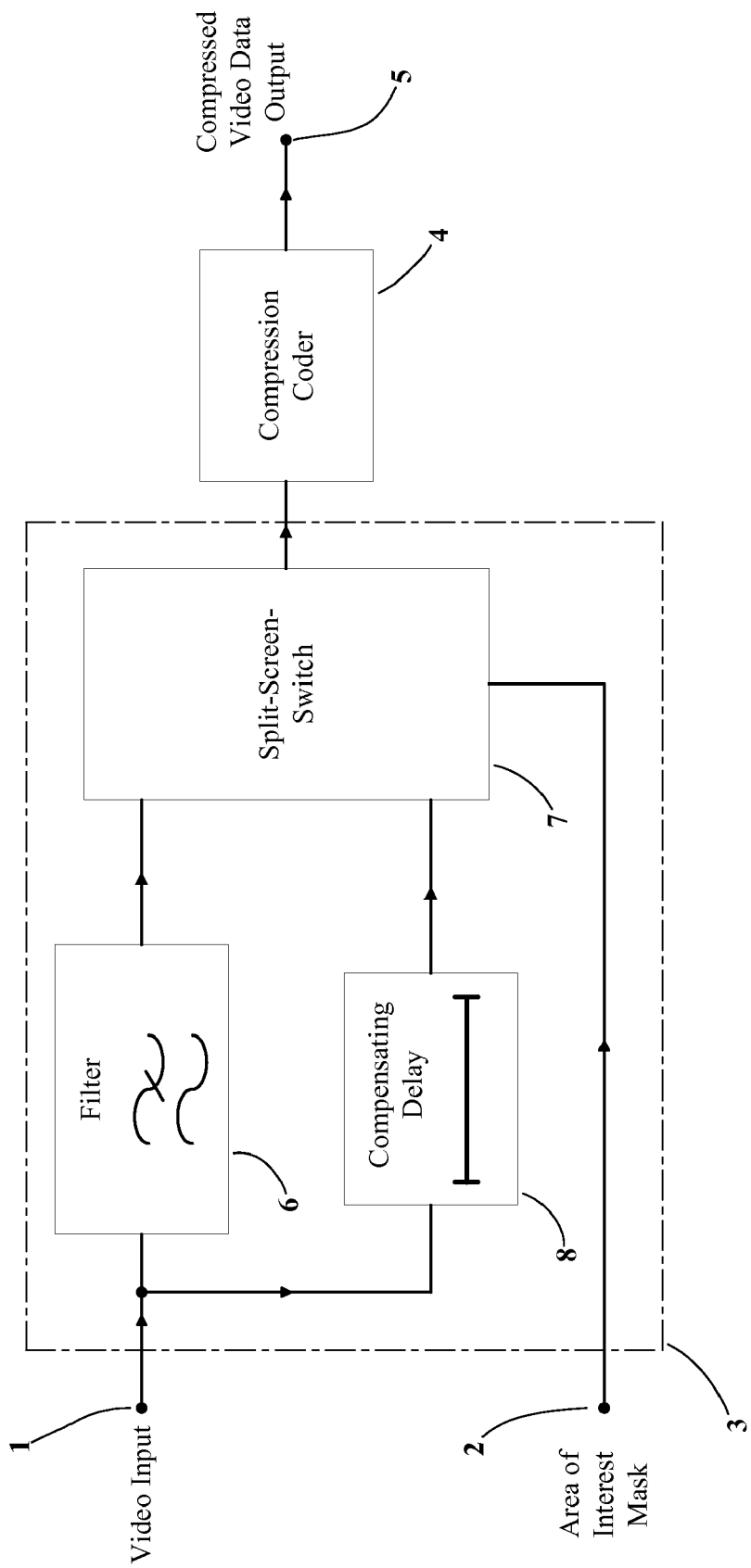
FIG. 1 shows a first example of a video coding process according to the invention.

A first example of a video compression process according to an aspect of the invention is shown in FIG. 1. An uncompressed video signal (1) is accompanied by an "area of interest mask" signal (2). This mask takes the form of a key signal with the same format as a luminance video signal, but having those parts of the picture comprising the area of interest represented as "white" and those parts not in the area of interest coded as "black". The edges of the area of interest need not be sharply defined and can include "gray" levels.

The mask may need to move or change in response to changes at the source camera, such as camera tracking or other movement; pan; tilt; zoom or focus adjustment. It may also need to move as important activity moves within the picture. If the video includes cuts or other transitions between different cameras it will be necessary for the mask to follow these transitions, some cameras or video sources may have their entire picture area defined as the area of interest. There may be more than one discrete area of interest within the same image.

The mask may be created by an operator using a pointing device to identify the position of the mask on a video display, possibly by defining a set of points which, when joined together form the mask boundary. In the case of a sporting event played on an area of known color, such as green grass, the known techniques of chroma-key can be used to generate a mask (possibly in advance of the broadcast), or to assist an operator to define a suitable mask. The mask may be modified in a digital effects processor (DVE) in response to data from a camera using methods similar to those used in video compositing and in "virtual studios".

The video signal (1) and mask (2) are fed to a compression pre-processor (3) whose video output is compressed in a compression coder (4) to make compressed video output data (5).

The exemplary pre-processor (3) includes a low pass filter (6) which makes the video easier to compress by attenuating features which would tend to increase the output compressed data rate. For example, high spatial frequencies, particularly when combined with movement, require more data in MPEG and similar compression systems. Compression pre-processors are well-known, and the filter (6) can use any of the known spatial, temporal adaptive or linear filters.

The output from the filter (6) feeds one input of a split-screen-switch (7), which is controlled by the mask signal (2). The second input of the switch (7) receives the unfiltered video input (1), delayed in a compensating delay (8) to be in synchronism with the output of the filter (6). When the mask indicates that a part of the picture is within the area of interest, the switch (7) sends the unfiltered video signal from the delay (8) to the coder (4), and when the mask indicates that the video is not in the area of interest the switch (7) sends the output of the filter (6) to the coder (4). When the mask is at a "gray" level at the edge of the area of interest, the switch (7) forms a mix, dependent on the mask level, between the filtered video signal from the filter (6) and the video signal from the delay (8).

The order (4) therefore will have more of its available data capacity available to code features within the area of interest. This coding gain results either in a reduction of the output data rate, or in fewer coding artifacts for a given output data rate.

Figure 2:
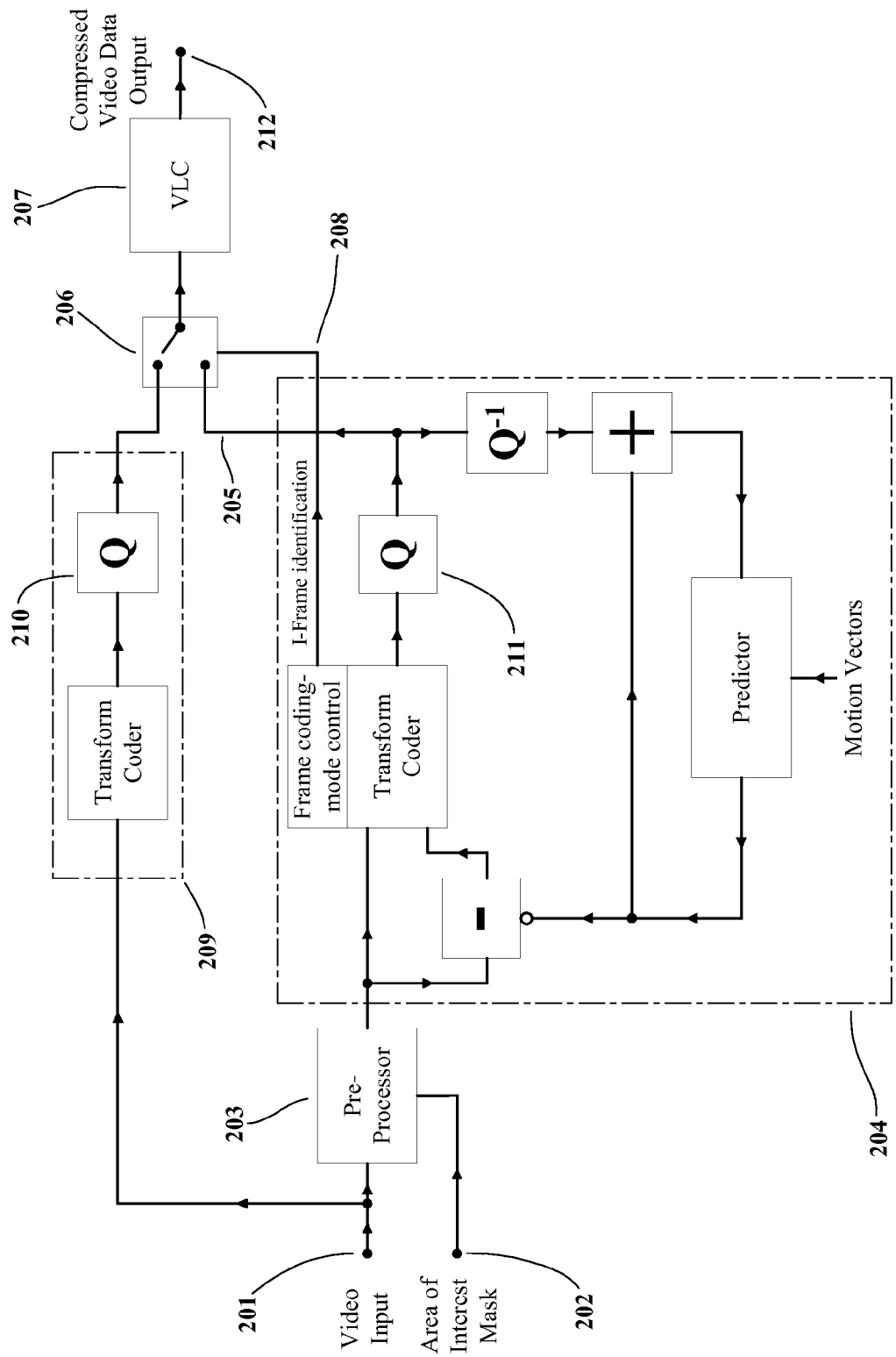
FIG. 2 shows a second example of a video coding process according to the invention.

A second example of a video coding process according to an aspect of the invention is shown in FIG. 2. This and subsequent examples make use of MPEG-2 coding for the principles are applicable to other coding schemes which combine the direct coding of features taken from within an individual image with the coding of predictions of other images derived from these directly coded features.

An uncompressed input video signal (201) is compression coded in dependence upon a mask signal (202) to make compressed video data (212). The compressed data is compatible with MPEG-2 and can be decoded by a standard MPEG-2 decoder.

As is well known, the MPEG-2 compression system uses a combination of transform coding of video information, transform coding of prediction errors, quantization of transform coefficients and variable length coding. The system of FIG. 2 uses "long GoP" encoding in which prediction-based coding is used for some of the frames and directly-coded (intra-coded) frames are also included in the sequence of frames. In accordance with one aspect of the invention, compression pre-processing is only applied to prediction-coded video, and directly coded (intra-coded) video is not pre-processed.

Referring to FIG. 2, the input video (201) and the mask (202) are fed in a compression pre-processor (203), which operates in the same way as the block (3) in FIG. 1. The resulting, selectively-filtered, video feeds a prediction, transform and quantization process (204) which operates in known manner according to the MPEG-2 standard to produce transform coefficients (205) representing, in compressed form, the video at the output of the pre-processor (203). The detailed operation of the block (204) will not be described here as it is shown in the standard form which is well understood by skilled persons. The coefficients (205) can be routed by a switch (206) to a variable length coder (207) to provide the compressed output (212). In this situation the system is equivalent to the system of FIG. 1.

However, the block (204) also provides an output (208), which indicates when an intra coded frame (I-frame) is being coded. During these frames the switch (206) selects quantized transform coefficients from an I-frame coding block (209) which encodes the video input (201) without any pre-processing. As the output from the block (209) is only used when the control signal (208) is active, the block (209) can, optionally, be disabled at other times by the control signal.

The output from the switch (206) comprises predicted frames from the block (204) and directly coded I-frames from the block (209). When the compressed video (212) is decoded by a standard MPEG decoder, it will use the non-pre-processed I-frames, together with the prediction errors from pre-processed frames, to construct the uncompressed output. This will give superior resolution, as compared to the system of FIG. 1, at the price of a small increase in the coded bit-rate.

In this process it is desirable that the coder (204) be designed not to include intra-coded areas within predicted frames. This is because it always receives pre-processed video, and so any intra-coded areas would be reproduced at low resolution, i.e. as filtered by the pre-processor (203), in a subsequent decoder.

The encoding system of FIG. 2 will also need to include a method of controlling the bit rate. This can be done in the conventional manner by changing the degree of quantization of the transform coefficients in dependence upon the amount of data in an output buffer. There are two quantizers in FIG. 2, one (210) in the I-frame encoder and a second (211) in the encoder (204). An output buffer is not shown in FIG. 2 for clarity, however it will usually be required and, if present, its level can conveniently be used to control both quantizers so as to achieve the required output data rate.

Figure 3:
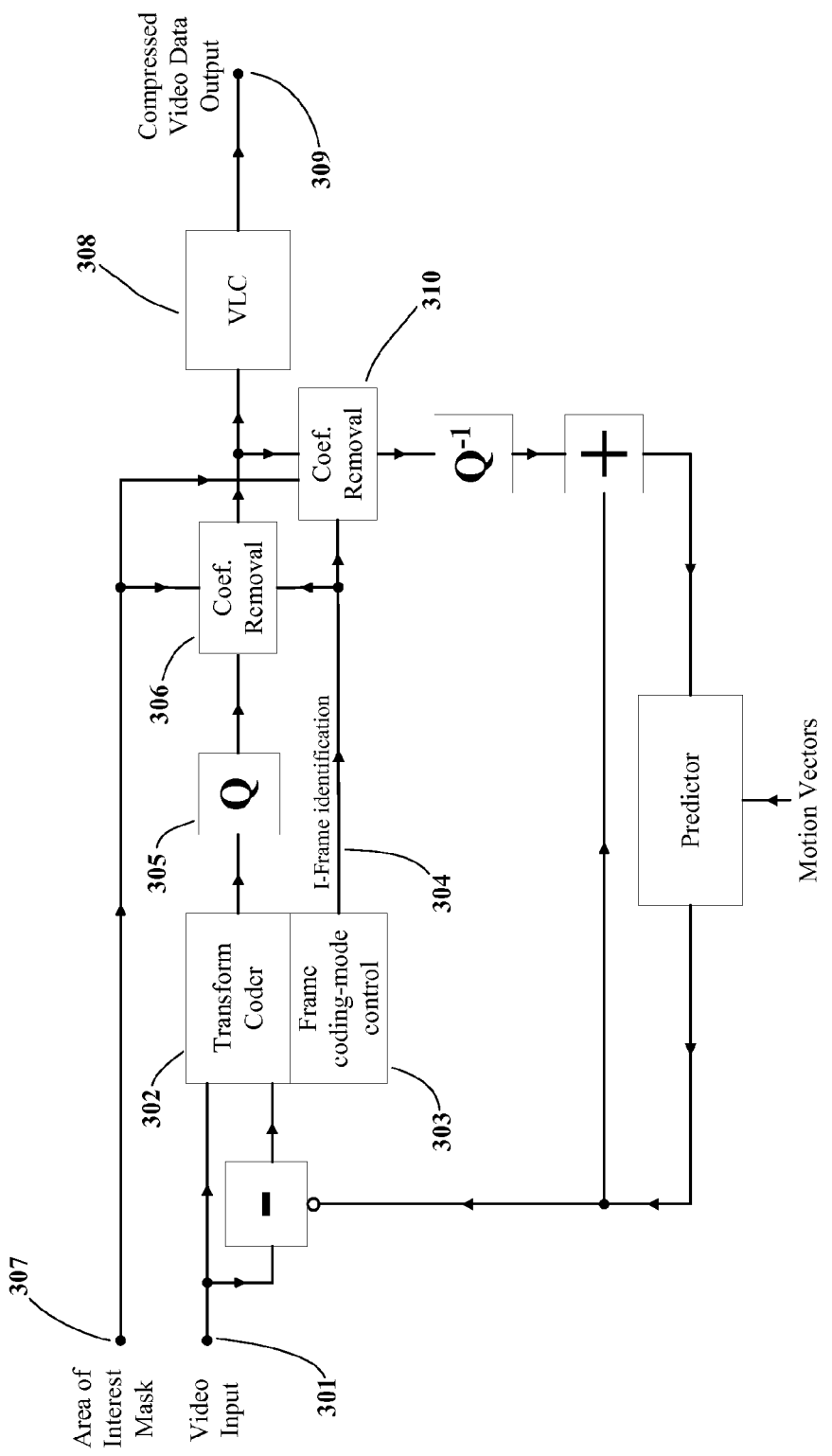
FIG. 3 shows a third example of a video coding process according to the invention.

A third example of a coding process according to an aspect of the invention is shown in FIG. 3. In this example the reduction of data outside the area of interest is achieved by removal of some transform coefficients relating to the area outside the area of interest.

Referring to FIG. 3, the uncompressed video input (301) is input to a transform coding block (302), which operates in the conventional way to produce frames if transform coefficients; the frames being either I-frames or prediction errors for predicted frames (which may be unidirectionally predicted frames, where differences between images are transformed, or, bidirectionally predicted frames where prediction errors derived from two other images are transformed). The choice of frame type is made by a mode control block (303) which outputs an I-frame identification signal (304).

The transform coefficients from the transform coding block (302) are quantized in a quantizer (305) in the conventional way, having due regard for the state of the output data buffer (not shown). The quantized coefficients are processed in a predicted-frame coefficient removal block (306), which also receives the area of interest mask signal (307). The block (306) removes visually less important coefficients (such as those describing high spatial frequencies) which correspond to areas of predicted frames which are outside the area of interest.

The reduced set of coefficients from the block (306) are variable-length-coded in the block (308) and form the coded output (309). They also feed a second coefficient removal block (310), which removes visually less important coefficients which correspond to areas of I-frames which are outside the area of interest. The output from the block (310) thus has had "less-interesting" coefficients removed from all frames, and this reduced set of coefficients is used in the prediction coding by the block (302).

It has already been mentioned that the mask is preferably not a one-bit signal and that the area of interest may have "soft" edges. The coefficient removal processes (306) and (310) can accommodate this by varying the coefficient removal criterion in dependence upon the mask value. For example, where coefficients represent spatial frequency only those representing the highest frequencies can be removed when the mask is at a relatively high level, and some lower frequency coefficients can be allowed to remain when the mask is at a lower level. Alternatively high spatial frequency coefficients could be attenuated outside the area of interest by multiplying them by the mask amplitude.

Also, as the transform is likely to be block-based, the mask edges may have to be aligned with the block boundaries, or the mask, sub-sampled at block centers to obtain the appropriate coefficient removal or attenuation parameter.

The invention may also be applied to the transcoding of video data which has already been compressed, if compressed video data is accompanied by an area of interest mask, it is possible to reduce the data used to describe areas outside the area of interest—for example by a variant of the method shown in FIG. 3. An example of such a transcoding process as applied to MPEG-2 coded video is shown in FIG. 4.

Figure 4:
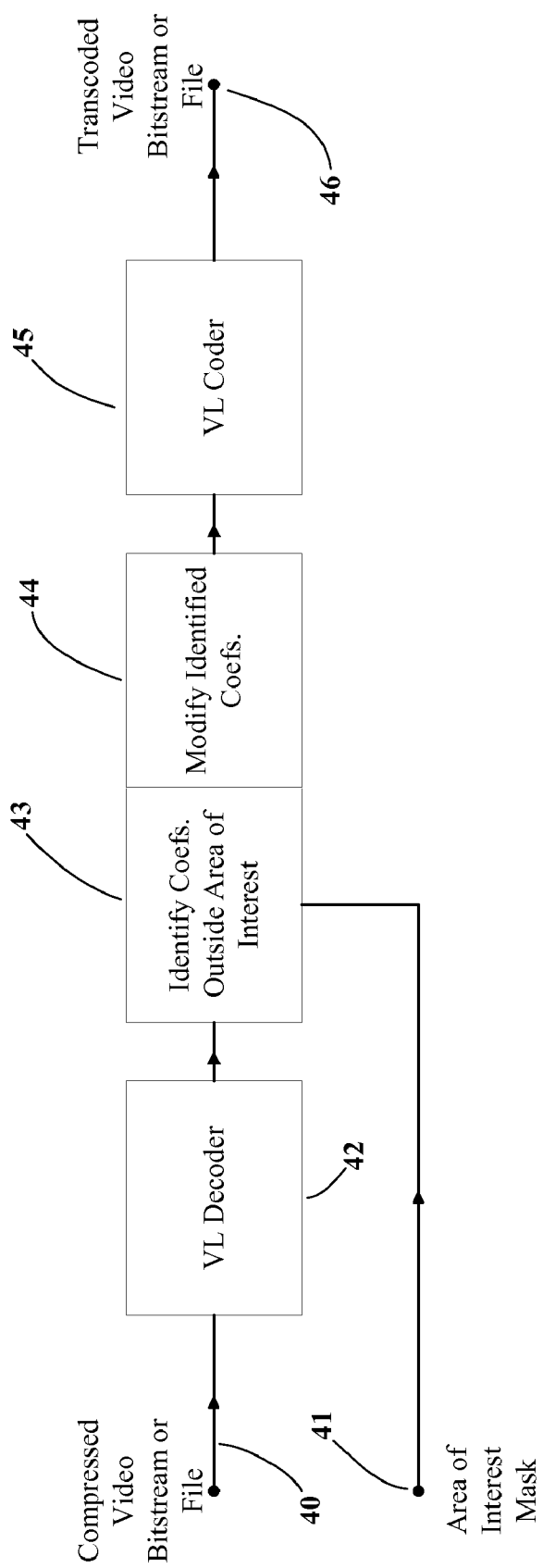
FIG. 4 shows a compressed video transcoding process according to the invention.

Referring to FIG. 4, an input compressed video bitstream or file (40) is accompanied by area of interest mask data (41). The data (41) could be included within the video bitstream of file (40) as metadata or provided separately, in either case it is necessary to ensure spatial and temporal synchronism between the two sets of data. This can be achieved by known video synchronization techniques including the use of time code or time stamps.

The video bitstream or file (41) is passed to a variable length code decoder (42), whose output will include quantized transform coefficients describing video frames and differences between frames, or prediction errors. A coefficient identification block (43) receives the coefficients from the decoder (42) and the area of interest mask data (41). This block identifies those transform coefficients which describe video features outside the area of interest.

A coefficient modification block (44) modifies some of the identified coefficients in a way analogous to the blocks (306) or (310) in FIG. 3. The modification comprises the deletion or attenuation of coefficients and has the effect of reducing the amount of data describing areas outside the area of interest. The modified coefficients, together with the (unmodified) remainder of the data from the variable length decoder (42) are passed to a variable length coder (45) which outputs a transcoded video bitstream or file (46).

The coefficient modification process (44) can operates in two possible ways either, all coefficients describing visually unimportant features outside the area of interest can be modified; or, only those coefficients describing visually unimportant inter-image differences, or prediction errors, outside the area of interest can be modified. Although the latter method results in a slightly higher output bit rate, it has the advantage that the superior resolution of I-frames will be retained in the decoder's prediction loop and applied to predicted frames.

As in the case of the other described embodiments of the invention, it may be necessary to control the output data rate, possibly in response to the fill-level of a data buffer receiving the transcoded video bitstream or file (46). The data rate control can be achieved by changing the operation of the coefficient modification process (44) to remove more or fewer coefficients in dependence upon the desired output data rate. As described previously in relation to FIG. 3, coefficients describing higher spatial frequencies can be removed first, and those describing lower spatial frequencies also removed when a lower output data rate is required.

The invention has been described by way of example and there are a number of alternative ways of putting it into effect. For example the processing need not be carried out on real-time signals, or streaming data, but instead video and mask data files can be processed, possibly at a speed faster or slower than real time. The spatial resolution, amplitude resolution, or coding of the mask signal or data may be different from that of the video signal or data so as to reduce the required input bandwidth of the system. The methods of the invention can be applied to transcoding between different compression schemes, data or video formats.

The invention claimed is:

1. An apparatus for compressing data representing a sequence of images in dependence upon data defining at least one region of particular interest within at least one image in the sequence, the apparatus being configured to provide data representing an image region outside the at least one region of particular interest that is more highly compressed than data representing an image region inside the at least one region of particular interest, the apparatus comprising:
 a video input;
 pre-processor apparatus which receives images from the video input and low pass filters data representing image regions outside the region or regions of particular interest;
 a first coder which receives images from the pre-processor and in a prediction, transform and quantization process provides intra-coded frames and prediction coded frames of transform coefficients;
 a variable length coder which receives transform coefficients and provides a compressed video data output;
 a switch; and
 a second coder which receives images from the video input and in a transform and quantization process provides intra-coded frames to the switch;
 wherein the switch receives an intra frame identification signal from the first coder and operates to provide the variable length coder with prediction coded frames of transform coefficients from the first coder and intra-coded frames of transform coefficients from the second coder.

2. Apparatus for compressing data representing a sequence of images in dependence upon data defining a region or regions of particular interest within one or more images in the sequence, in which data representing image regions outside the regions of particular interest is more highly compressed than data representing image regions inside the regions of particular interest, the apparatus comprising:
 a video input;
 transform coder apparatus which receives images from the video input and differences from a predictor and provides intra-coded frames and prediction coded frames of transform coefficients to a quantiser; and
 a variable length coder which receives transform coefficients and provides a compressed video data output;
 a predicted frame coefficient removal block which receives transform coefficients from the quantiser, an area of interest mask signal, and an intra frame identification signal from the coder and which removes visually less important coefficients from prediction coded frames of transform coefficients from outside the area of interest and which provides transform coefficients to the variable length coder; and a second coefficient removal block which receives transform coefficients from the predicted frame coefficient removal block, the area of interest mask signal and the intra frame identification signal from the coder and which removes visually less important coefficients from intra coded frames of transform coefficients from outside the area of interest and provides transform coefficients through an inverse quantiser to the predictor.

3. A non-transitory computer program product for compressing data representing a sequence of images in dependence upon data defining at least one region of particular interest within at least one image in the sequence, in which data representing an image region outside the at least one region of particular interest is more highly compressed than data representing an image region inside the at least one region of particular interest, the program product adapted to cause programmable apparatus to adopt a configuration comprising:
    a video input;
    a pre-processor which receives images from the video input and low pass filters data representing image regions outside the region or regions of particular interest;
    a first coder which receives images from the pre-processor and in a prediction, transform and quantization process provides intra-coded frames and prediction coded frames of transform coefficients;
    a variable length coder which receives transform coefficients and provides a compressed video data output;
    a switch; and
    a second coder which receives images from the video input and in a transform and quantization process provides intra-coded frames to the switch;
    wherein the switch receives an intra frame identification signal from the first coder and operates to provide the variable length coder with prediction coded frames of transform coefficients from the first coder and intra-coded frames of transform coefficients from the second coder.

4. A non-transitory computer program product for compressing data representing a sequence of images in dependence upon data defining a region or regions of particular interest within one or more images in the sequence, in which data representing image regions outside the regions of particular interest is more highly compressed than data representing image regions inside the regions of particular interest, the program product adapted to cause programmable apparatus to adopt a configuration comprising:
    a video input;
    a transform coder which receives images from the video input and differences from a predictor and provides intra-coded frames and prediction coded frames of transform coefficients to a quantiser; and
    a variable length coder which receives transform coefficients and provides a compressed video data output;
    a predicted frame coefficient removal block which receives transform coefficients from the quantiser, an area of interest mask signal; and an intra frame identification signal from the coder and which removes visually less important coefficients from prediction coded frames of transform coefficients from outside the area of interest and which provides transform coefficients to the variable length coder; and
    a second coefficient removal block which receives transform coefficients from the predicted frame coefficient removal block, the area of interest mask signal and the intra frame identification signal from the coder and which removes visually less important coefficients from intra coded frames of transform coefficients from outside the area of interest and provides transform coefficients through an inverse quantiser to the predictor.

\* \* \* \* \*